（12）United States Patent
Puri (10) Patent No.: US 9,607,207 B1
(45) Date of Patent: Mar. 28, 2017

(54) PLANE-FITTING EDGE DETECTION (71) Applicant: Amazon Technologies, Inc., Seattle, WA (US)

(72) Inventor: Manika Puri, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 298 days.

(21) Appl. No.: 14/231,191

(22) Filed: Mar. 31, 2014

(51) Int. Cl.
*G06K 9/00* (2006.01)

(52) U.S. Cl.
CPC ................ *G06K 9/00201* (2013.01)

(58) Field of Classification Search
CPC ........ G06K 9/00; G06K 9/46; G06K 9/00201; G06T 7/00; G06T 7/0051; G06T 7/0081; G06T 2207/10024; G06T 2207/10028; H04N 13/02; H04N 13/0239
USPC .... 382/154, 106, 199, 103, 260; 348/43, 47, 348/46, E13.074
See application file for complete search history.

(56) References Cited

U.S. PATENT DOCUMENTS

| 7,418,392 | B1 | | 8/2008 | Mozer et al. | |
|---|---|---|---|---|---|
| 7,720,683 | B1 | | 5/2010 | Vermeulen et al. | |
| 7,774,204 | B2 | | 8/2010 | Mozer et al. | |
| 8,774,544 | B1 | * | 7/2014 | Szedo | G06K 9/40 |
| | | | | | 382/260 |
| 2008/0075371 | A1 | * | 3/2008 | Dana | G06K 9/4661 |
| | | | | | 382/199 |
| 2012/0170853 | A1 | * | 7/2012 | Song | G06T 5/006 |
| | | | | | 382/199 |
| 2012/0223885 | A1 | | 9/2012 | Perez | |
| 2012/0250978 | A1 | * | 10/2012 | Taylor | G06T 7/0081 |
| | | | | | 382/154 |
| 2013/0107010 | A1 | * | 5/2013 | Hoiem | G06T 7/0081 |
| | | | | | 348/47 |
| 2013/0132407 | A1 | * | 5/2013 | Krishnmurthy | G06F 17/175 |
| | | | | | 707/750 |
| 2014/0119595 | A1 | * | 5/2014 | Gallo | G06T 3/0081 |
| | | | | | 382/103 |

FOREIGN PATENT DOCUMENTS

WO    WO2011088053 A2    7/2011

OTHER PUBLICATIONS

Bahnisch, et al. "Fast and Accurate 3D Edge Detection for Surface Reconstruction" retrieved at <<http://hci.iwr.uni-heidelberg.de/publications/mip/techrep/baehnisch_09_fast.pdf>>, Sep. 2009, 10 pages.

(Continued)

*Primary Examiner* — Mek Onen Bekele
(74) *Attorney, Agent, or Firm* — Lee & Hayes, PLLC (57) ABSTRACT

Techniques are described for determining edge pixels from a depth map in order to identify edges of an object within an environment. The techniques may fit a plane to a group of pixels comprising a subject pixel and neighbors of the subject pixel. Each pixel of the group may then be classified as either an inlier pixel or an outlier pixel, and a ratio of inlier pixels to outlier pixels of the group may be calculated. The techniques then compare this ratio to a threshold ratio to designate the subject pixel as either an edge pixel or a non-edge pixel. Edge pixels designated in this manner may then be used to identify object edges and, hence, objects in the environment.

17 Claims, 5 Drawing Sheets

(56) References Cited

OTHER PUBLICATIONS

Maini, et al., "Study and Comparison of Various Image Edge Detection Techniques", International Journal of Image Processing (IJIP), vol. 3 : Issue (1), 2009, 12 pages.

Schafer, et al., "Depth and Intensity Based Edge Detection in Time-of-Flight Images", Jun. 29-Jul. 1, 2013, 2013 International Conference on 3D Vision, 8 pages.

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

PLANE-FITTING EDGE DETECTION

BACKGROUND

A large and growing population of people is enjoying entertainment through consumption of digital content items, such as music, movies, images, books, and so on. Many people today consume digital content through a wide variety of electronic devices. Among these electronic devices are cellular telephones, personal digital assistants (PDAs), electronic book readers, portable media players, tablets, netbooks, and the like. As more content is made available in digital form, people continue to consume more and more of this content. In addition, this population expects digital content to become more and more accessible and ubiquitous.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes architectures and techniques for detecting edges of an object in an environment and identifying the object from the edges. In some instances, a camera or other sensor creates a depth map of the environment using any suitable depth-detection techniques, such as time-of-flight (ToF) techniques, LIDAR, or the like. The depth map may comprise a two-dimensional (2D) grid of pixels, with each pixel being associated with a respective depth.

After obtaining a depth map, the techniques may fit a plane to each pixel of the depth map. To do so, the techniques may identify a depth of the subject pixel and respective depths of pixels that neighbor the subject pixel. These neighbors may include immediately adjacent neighbors (i.e., pixels that share a border with the subject pixel) and, potentially, additional neighbors (e.g., pixels that are immediately adjacent to the pixels that are immediately adjacent to the subject pixel). After identifying neighbors of the subject pixel, the techniques may use a total least squares regression algorithm, an approximation of a total least squares regression algorithm, or other mathematic techniques to fit a plane to this group of pixels based on the depths of pixels of the group. The plane may take the form of the following equation:

$$\text{Fitted Plane} = Ax + By + Cz + D$$

After fitting the plane (i.e., identifying the values of A, B, C, and D), the techniques may determine which pixels of group belong to the plane and which pixels of the group do not. For instance, the techniques may determine, for each pixel, a distance from the pixel to the fitted plane. This distance may then be compared to a threshold distance. Pixels within the threshold distance are considered to be an inlier pixel—or pixels that belong to the plane. Pixels that are outside the threshold, meanwhile, are considered outlier pixels—or pixels that do not belong to the plane.

After classifying each pixel of the group of pixels as either an inlier pixel or an outlier pixel, the techniques may then calculate a ratio based on inlier and outlier pixels (e.g., a ratio of inlier pixels to outlier pixels, outlier pixels to inlier pixels, inlier pixels to total pixels of the group, outlier pixels to total pixels of the group, etc.). In this example, the techniques calculate a ratio of inlier pixels to outlier pixels for the group and may compare this ratio to a threshold ratio. If the ratio is less than the threshold—meaning there are a significant number of outlier pixels—then the subject pixel (e.g., the middle pixel of the group) is classified as an edge pixel, or a pixel that represents an edge of an object in the environment. If, however, the ratio is not less than the threshold ratio, then the subject pixel may be classified as a non-edge pixel or a pixel that does not represent an edge of an object in the environment.

This process may repeat for each pixel in the depth map, such that multiple edge pixels may be identified. Thereafter, the techniques may connect these edge pixels to identify object edges, after which a periphery of one or more objects may be identified. In some instances, the periphery is compared to one or more pre-stored peripheries associated with known objects for the purpose of identifying the object associated with the periphery. The object may comprise any sort of object in an environment, including a table, computer, television, person, animal, or any other type of object. In some instances, the identified object comprises a display medium for projecting a content item onto, as described below with reference to FIG. 1. In some instances, the display medium comprises a portable display medium that is movable by the user and, therefore, the techniques may seek to identify and track the display medium in order to continue to project a particular content item onto the display medium as the user moves the display medium in the environment.

As described above, the ratio of inlier to outlier pixels may be compared to a threshold ratio in order to classify the subject pixel as an edge-pixel or a non-edge pixel. In some implementations described herein, however, the techniques may implement multiple threshold ratios and multiple classifications. For instance, the techniques may implement a first threshold ratio and a second threshold ratio that is less than the first threshold ratio. In these instances, the ratio of inlier to outlier pixels may be compared to the first threshold ratio. If the ratio is greater than the first threshold ratio— meaning that there is a significant number of inlier pixels— then the subject pixel may be classified as a non-edge pixel. If the ratio is less than the first threshold ratio then the techniques may compare the ratio to the second threshold ratio. If the ratio is less than this second threshold, then the subject pixel may be classified or designated as a strong edge pixel. If, however, the ratio is not less than the second threshold ratio (but still less than the first threshold ratio), then the subject pixel may be classified or designated as a weak edge pixel. As used herein, a strong edge pixel comprises a pixel of a group of pixels that has a greater ratio of outlier pixels to inlier pixels as compared to a weak edge pixel or a non-edge pixel. That is, a strong edge pixel may comprise a "middle" pixel of a group of pixels where a large number of the pixels of the group of pixels do not belong to the plane that was fitted to the group. A weak edge pixel, meanwhile, may comprise a middle pixel of a group of pixels where a moderate number of pixels of the group do not belong to a plane that has been fitted to the group, but not as many outlier pixels as a group of pixels associated with a strong edge pixel. A strong edge pixel, therefore, represents an edge of an object in the environment with a higher degree of certainty than a weak edge pixel.

After designating each pixel in the depth map as either a non-edge pixel, a weak edge pixel, or a strong edge pixel, the techniques may determine which of the edge pixels to use in identifying edges of an object. To do so, the techniques may determine, for each weak edge pixel, whether it is within a threshold distance to a strong edge pixel. For instance, the techniques may determine whether it is immediately adjacent to a strong edge pixel, within two jumps on the depth map to a strong edge pixel, or the like. If the weak edge pixel is indeed within a threshold distance to a strong edge pixel, then this weak edge pixel may be used to determine edges of an object. If not, however, then the weak edge pixel may be disregarded, similar to treatment of a non-edge pixel. The techniques may then identify edges of an object using weak edge pixels that meet the above criteria, along with each strong edge pixel.

The techniques described in detail below may be implemented in a number of ways and in a number of contexts. One example implementation and context is provided with reference to the following figures, as described below in more detail. It is to be appreciated, however, that the following implementation and context is but one of many.

Figure 1:
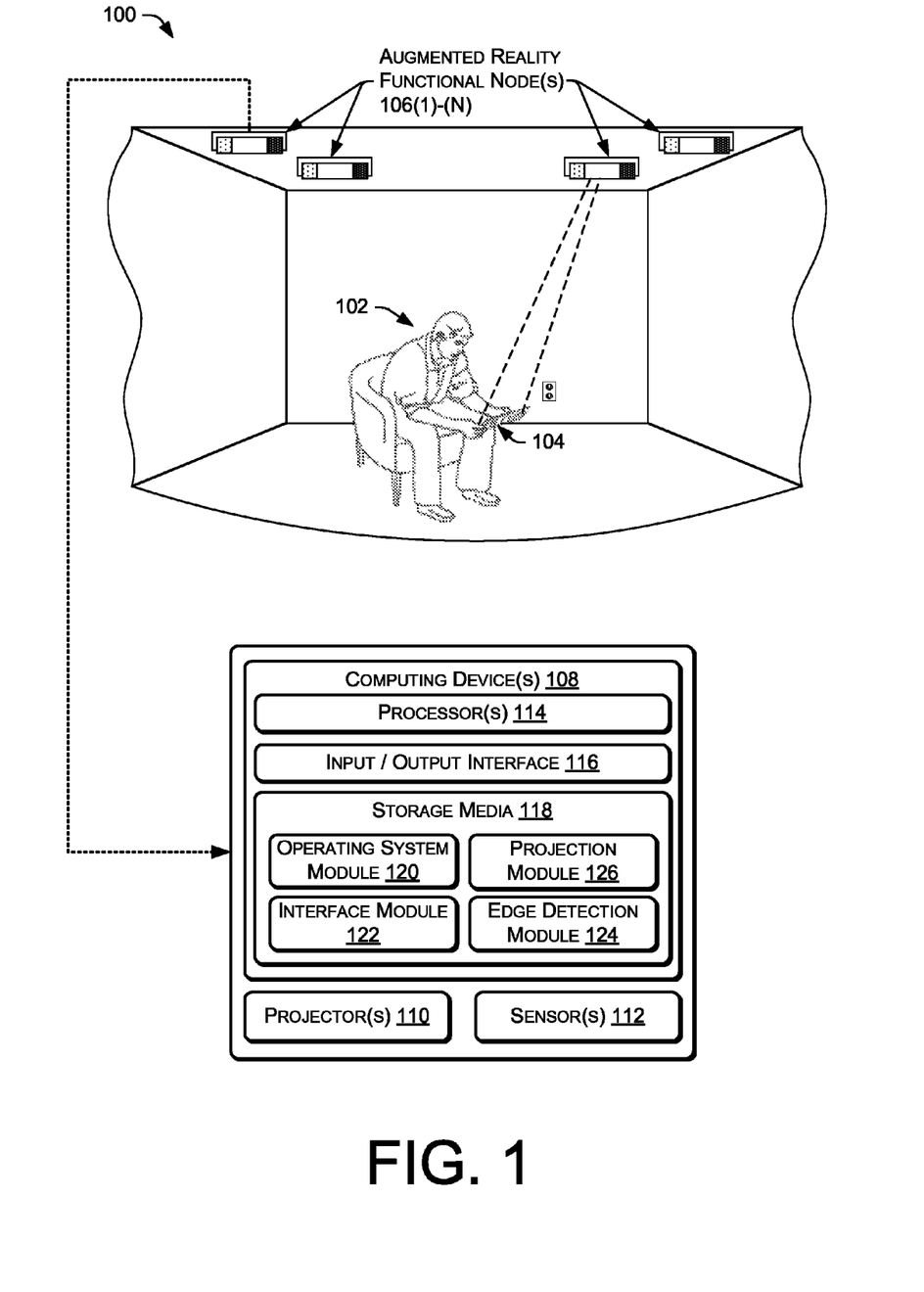
FIG. 1 illustrates an example environment that includes an augmented reality functional node (ARFN) configured to identify an object in an environment by recognizing edges of the object in a depth map.

FIG. 1 illustrates an example environment 100 in which a user 102 consumes content that is projected onto a display medium 104 by one or more augmented reality functional nodes (ARFNs) 106(1), . . . , 106(N) (collectively referred to as "the ARFN 106" in some instances). It is to be appreciated that the techniques described herein may be performed by a single ARFN, by a collection of any number of ARFNs, or by any other devices or combinations of devices. The projected content may include electronic books, videos, images, interactive menus, or any other sort of visual and/or audible content.

The display medium 104 may generally comprise a passive and/or non-powered medium onto which content is projected. In some instances, the display medium 104 comprises a movable and/or handheld object, such as a piece of paper, furniture, or poster board. Further, in some instances the display medium 104 comprises an object that may not be easily movable in the environment 100, such as a wall, ceiling, floor, etc.

As illustrated, the ARFN node 106 comprises a computing device(s) 108, a projector(s) 110, and a sensor(s) 112 (e.g., camera, ranging system, etc.). Some or the all of the computing device(s) 108 may reside within a housing of the ARFN node 106 or may reside at another location that is operatively connected to the ARFN node 106. The computing device(s) 108 comprises a processor(s) 114, an input/output interface 116, and storage media 118. The processor(s) 114 may be configured to execute instructions that may be stored in the storage media 118 or in other storage media accessible to the processor(s) 114.

The input/output interface 116, meanwhile, may be configured to couple the computing device(s) 108 to other components of the ARFN node 106, such as the projector(s) 110, the sensor(s) 112, other ARFN nodes (such as in other environments or in the environment 100), other computing devices, network communication devices (such as modems, routers, and wireless transmitters), and so forth. The coupling between the computing device(s) 108 and other devices may be via wire, fiber optic cable, wireless connection, or the like. The sensor(s) 112 may include, in various embodiments, cameras (motion and/or still cameras), audio sensors such as microphones, ultrasound transducers, heat sensors, motion detectors (including infrared imaging devices), depth sensing cameras, weight sensors, touch sensors, tactile output devices, olfactory sensors, temperature sensors, humidity sensors, and pressure sensors. Other sensor types may be utilized without departing from the scope of the present disclosure.

The storage media 118, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory, or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device(s) 108. The storage media 118 may reside within a housing of the ARFN 106, on one or more storage devices accessible on a local network, on cloud storage accessible via a wide area network, or in any other accessible location. As defined herein, CRSM does not include communication media, such as modulated data signals and carrier waves.

The storage media 118 may store several modules, such as instructions, data stores, and so forth that are configured to execute on the processor(s) 114. For instance, the storage media 118 may store an operating system module 120, an interface module 122, an edge detection module 124, and a projection module 126. The storage media 118 may also include other modules, which may be configured to implement various different functionality of the ARFN 106.

The operating system module 120 may be configured to manage hardware and services within and coupled to the computing device(s) 108 for the benefit of other modules. The interface module 122, meanwhile, may be configured to receive and interpret commands received from users within the environment 100. For instance, the interface module 122 may analyze and parse images captured by one or more cameras of the sensor(s) 112 to identify users within the environment 100 and to identify gestures made by users within the environment 100, such as gesture commands to project display content. In other instances, the interface module 122 identifies commands audibly issued by users within the environment and captured by one or more microphones of the sensor(s) 112. In still other instances, the interface module 122 allows users to interface and interact with the ARFN node 106 in any way, such as via physical controls, and the like.

The edge detection module 124 may identify objects in the environment 100 by detecting edges of the objects in a depth map, using some or all of the techniques described above and below. For instance, the edge detection module 124 may identify the display medium 104, the user 102, and/or any other type of object. As described in further detail above and below, the module 124 may determine edge pixels from a depth map in order to identify edges of an object within the environment 100. The techniques may fit a plane to a group of pixels comprising a subject pixel and neighbors of the subject pixel. Each pixel of the group may then be classified as either an inlier pixel or an outlier pixel, and a ratio of inlier pixels to outlier pixels of the group may be calculated. The module 124 may then compare this ratio to a threshold ratio to designate the subject pixel as either an edge pixel or a non-edge pixel. Edge pixels designated in this manner may then be used to identify object edges and, hence, objects in the environment 100.

A projection module 126 may receive the information about the location of the display medium 104 and may manipulate the projected content so that it appears correctly on the display medium 104. For example, the projection module 126 may vary the size, location, orientation, and/or aspect ratio of the projected image. The projection module may also use techniques such as keystone correction to correct the appearance of the projected image in situations where the projection source is not aligned with the display medium. For example, the projected image may be intentionally distorted to account for a non-perpendicular alignment of the display medium with respect to the projection source. In some situations, the projected image may also be distorted to correct for irregularities or non-planar characteristics of the display medium 104.

Figure 2:
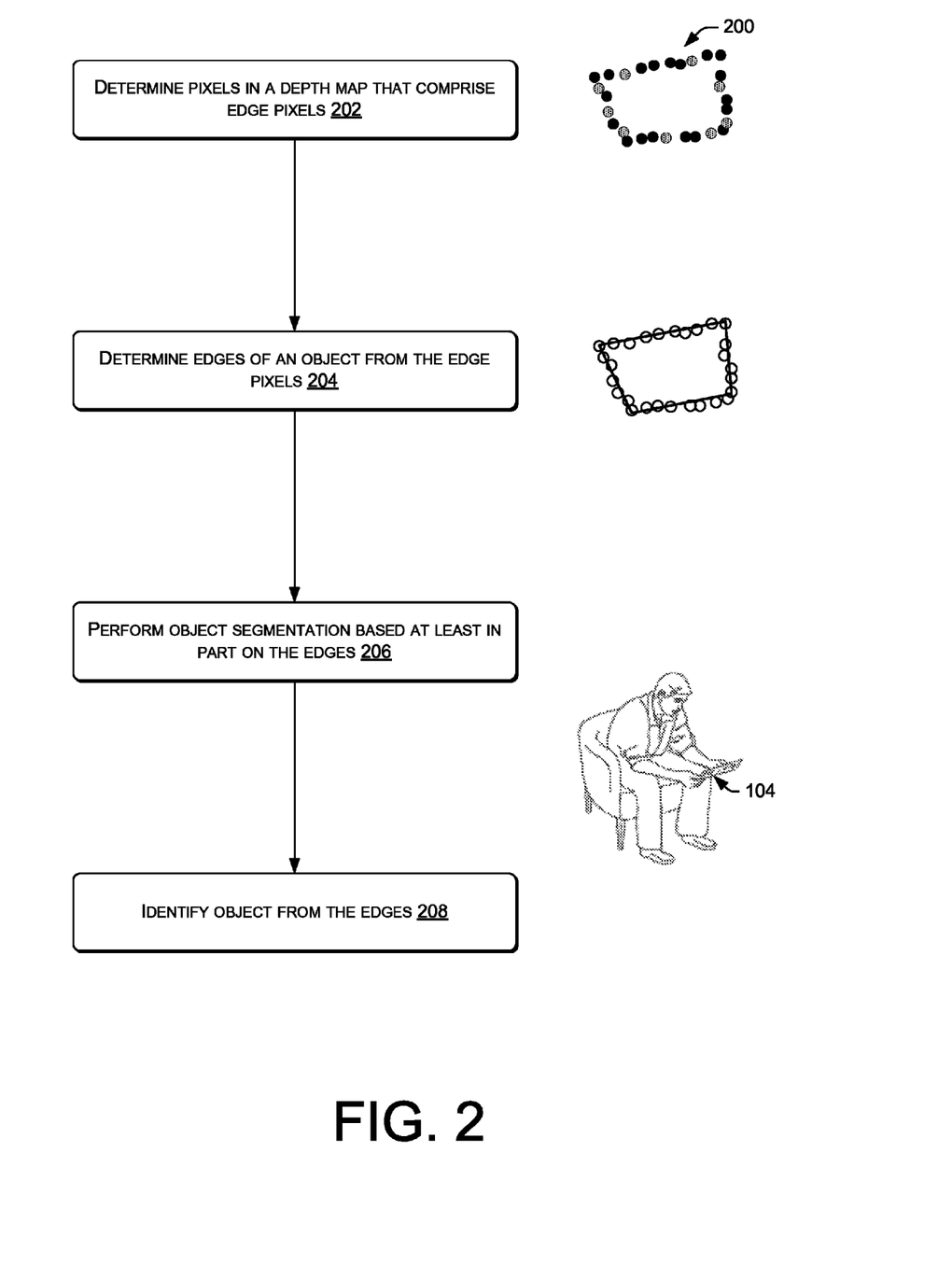
FIG. 2 is an example flow diagram of determining edge pixels in a depth map, determining edges of an object based on the edge pixels, and identifying an object from the edges.

FIG. 2 illustrates an example process 200 for determining edge pixels in a depth map, determining edges of an object based on the edge pixels, and identifying an object from the edges. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. In some instances, the edge detection module 124 performs some or all of the operations of the described processes.

At 202, the process 200 determines pixels in a depth map that comprise edge pixels. In some instances, the operation 202 may be performed using the techniques shown in FIGS. 3 and/or 4. In some instances, the operation 202 may include determining both strong edge pixels and weak edge pixels. FIG. 2, for instance, illustrates two different types of circles, representing these two different designations. While FIG. 2 illustrates two different designations of edge points, in other implementations the process 200 may utilize any other number of designations.

At 204, the process 200 determines edges of an object in the environment using the edge pixels. For instance, the process 200 may connect the edge pixels from the depth map. In some instances, the process 200 may use, when determining the object edges: (1) the strong edge pixels, and (2) the weak edge pixels that are within a threshold distance of a strong edge pixel (e.g., are immediately adjacent to a strong edge pixel). This threshold distance may be either a two-dimensional distance (e.g., based on a distance between pixels on the X-Y portion of a depth map) or a three-dimensional distance (e.g., based on distance between pixels using X-Y-Z dimensions of the pixels on the depth map).

At 206, the process 200 performs object segmentation from the depth map based at least in part on the edges, as well as based on other inputs (e.g., color maps from an RGB camera, etc.) Finally, at 208, the process 200 may identify one or more objects from the environment from the segmented group of pixels. As illustrated, this object may comprise the display medium 104 from FIG. 1.

Figure 3:
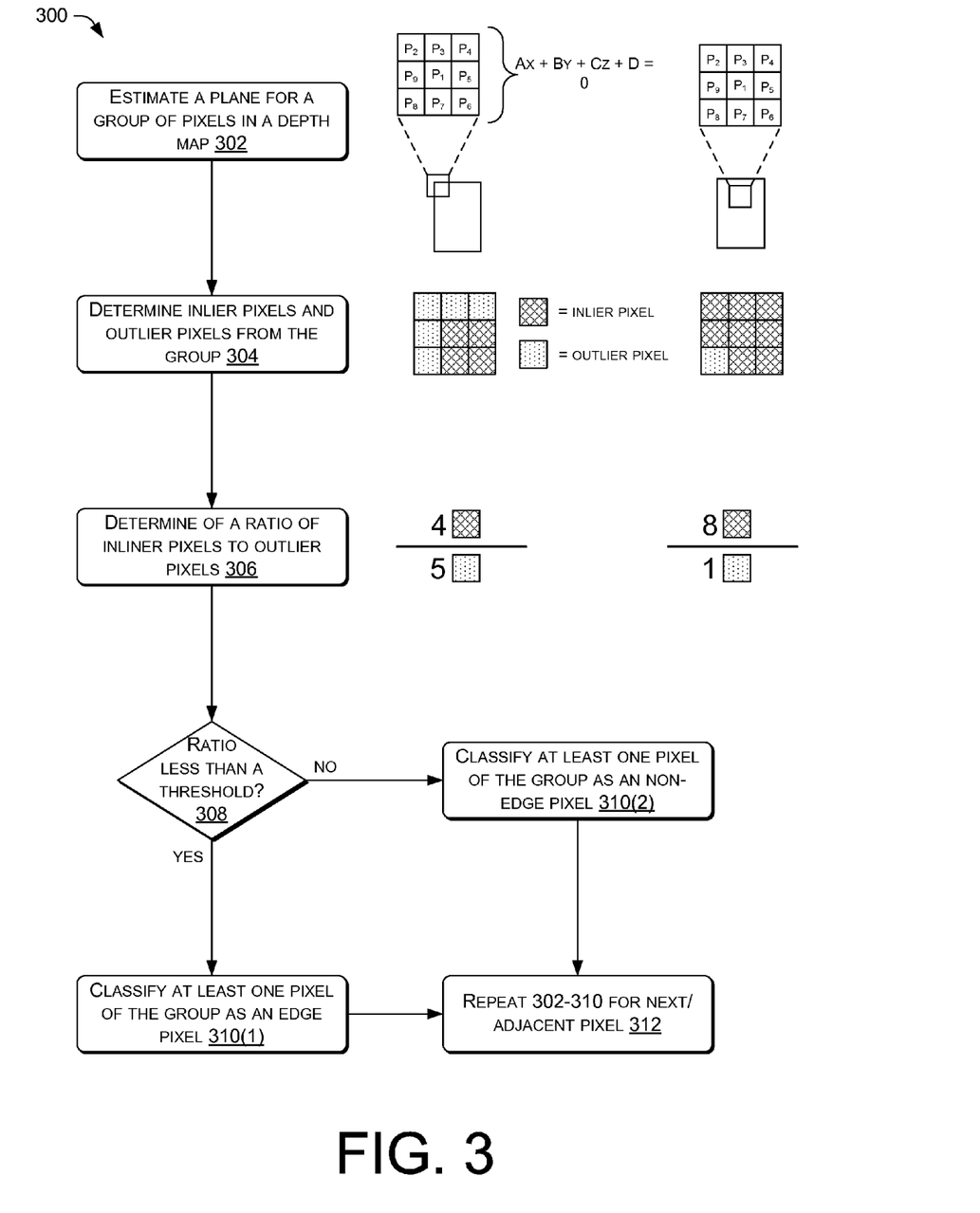
FIG. 3 is an example flow diagram for determining an edges pixel in a depth map, which may be repeated across some or all pixels of the depth map to identify each edge pixel in the depth map. The process includes fitting a plane to a group of pixels, identifying pixels of the group that belong to the plane (inlier pixels) and those that do not (outlier pixels), and classifying a pixel of the group as an edge pixel or non-edge pixel based on the inlier and outlier pixels.
Figure 4:
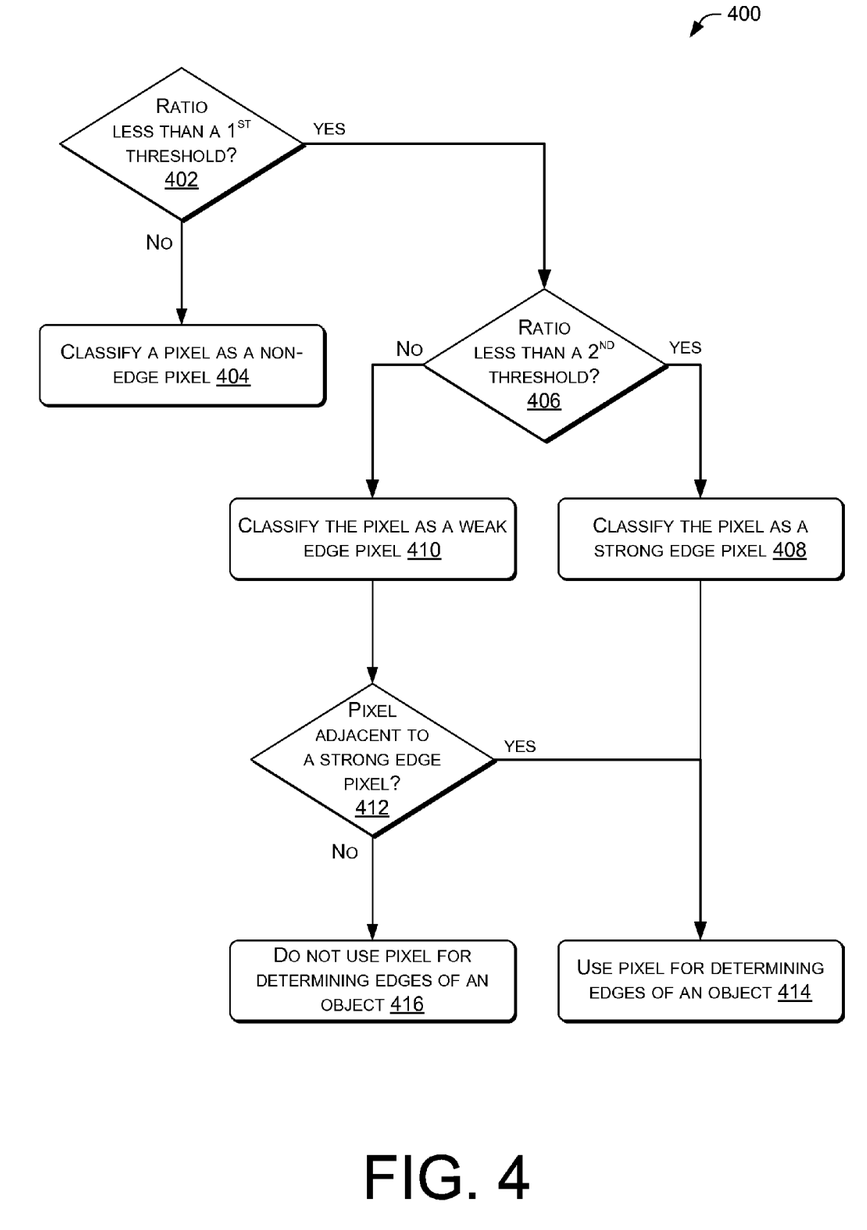
FIG. 4 is an example flow diagram for classifying pixels as strong edge pixels, weak edge pixels, and non-edge pixels, as well as determining which of the strong and weak edge pixels to use in determining edges of an object.

FIG. 3 illustrates an example process 300 for determining an edges pixel in a depth map, which may be repeated across some or all pixels of the depth map to identify each edge pixel in the depth map. The process includes fitting a plane to a group of pixels, identifying pixels of the group that belong to the plane (inlier pixels) and those that do not (outlier pixels), and classifying a pixel of the group as an edge pixel or non-edge pixel based on the inlier and outlier pixels.

At 302, the process 300 estimates or fits a plane to a group of pixels of a depth map. The group of pixels may include a middle pixel and neighbors of the middle pixel. That is, as shown at 302, the middle pixel (or "subject pixel") may comprise that pixel that is at the very middle of a group, while each other pixel in the example group is an immediately adjacent neighbor of the middle pixel (i.e., touches an edge of the middle pixel). As described above, the process 300 may use a total least squares regression algorithm or other mathematic techniques to fit a plane to this group of pixels based on the depths of these pixels from a depth map obtained by a camera, with each depth measurement indicating a distance from the camera to a surface corresponding to the pixel in the depth map. The plane may take the form of the following equation:

$$Ax+By+Cz+D=0$$

The illustration shows two examples, one corresponding to a group of pixels that is at the edge of the display medium 104 and the other corresponding to a group of pixels that is in the middle of the display medium.

After fitting the plane, at 304 the process 300 may determine inlier and outlier pixels from the group. This may comprise comparing, for each pixel of the group, a depth measurement of the pixel to a calculated depth of the pixel using the fitted equation. The process 300 then determines a difference between these two depths and compares this distance differential to a threshold distance. If the distance is greater than the threshold, then the operation 304 may designate the pixel an outlier pixel. If the distance is less than the threshold, however, then the operation 304 may designate the pixel as an inlier pixel. The operation 304 may perform this comparison for each pixel of the group of pixels. In the illustrated examples, the first group of pixels includes four inlier pixels and five outlier pixels, while the second group includes eight and one respectively.

At 306, the process 300 determines a ratio based on the number of inlier pixels of the group and outlier pixels of the group. This ratio may comprise any of the ratios described above. In the illustrated example, the ratio comprises a ratio of inlier pixels to outlier pixels. At 308, the process 300 determines whether this ratio is less than a threshold ratio. If so, then at 310(1) the process 300 classifies or designates the middle or "subject" pixel as an edge pixel. That is, if the ratio is less than the threshold ratio, then the group of pixels has relatively few pixels that belong to the plane (i.e., inlier pixels) and a relatively large number of pixels that do not belong to the plane (i.e., outlier pixels). As such, it is deduced that the pixel group may be near an edge of an object, since the pixels do not appear to nicely fit to a common plane based on their depth measurements and, hence, it is deduced that the middle pixel may be an edge pixel in the depth.

If the ratio is not less than the threshold ratio, however, then at 310(2) the process 300 classifies or designates this pixel as a non-edge pixel, given that the group includes a relatively large number of pixels that belong to the fitted plane, as would be expected where the group of pixels does not correspond to an edge of an object. At 312, the process 300 repeats the operations 302-310 for a subsequent pixel in the depth map, such as pixel that is adjacent to the subject pixel.

In instances where the calculated ratio is different than inlier pixels to outlier pixels, the process 300 may compare the calculated ratio to a different threshold ratio or may make a different determination. For instance, the process 300 may calculate a ratio of outlier pixels to inlier pixels and may determine whether this ratio is greater than the threshold ratio at 308. If so, then the subject pixel may be classified as an edge pixel. If not, then it may be classified as a non-edge pixel. Different threshold ratios may be used if other ratios are calculated, such as a number of inlier or outlier pixels to a total number of pixels of the group, as one skilled in the art will appreciate.

FIG. 4 illustrates an example process 400 for classifying pixels as strong edge pixels, weak edge pixels, and non-edge pixels, as well as determining which of the strong and weak edge pixels to use in determining edges of an object.

At 402, the process 400 determines whether a ratio of inlier pixels to outlier pixels for a group of pixels (e.g., as calculated at operation 306 of FIG. 3) is less than a first threshold ratio. If not, then at 404 the process classifies the subject pixel of the group as a non-edge pixel. If it is, however, then at 406 the process 400 determines whether the calculated ratio is less than a second threshold ratio that is even less than the first threshold ratio. If so, then the process 400 designates the subject pixel as a strong edge pixel at 408. If not, then at 410 the process 400 classifies the subject pixel as a weak edge pixel and, at 412, determines whether the subject pixel is within a threshold distance on the depth map to a strong edge pixel (e.g., is adjacent to a strong edge pixel). If so, then at 414 the process 400 uses this weak edge pixel (along with each strong edge) pixel for determining edges of an object. If not, however, then at 416 the weak edge pixel is disregarded and not used for determining edges of an object in the environment.

Figure 5:
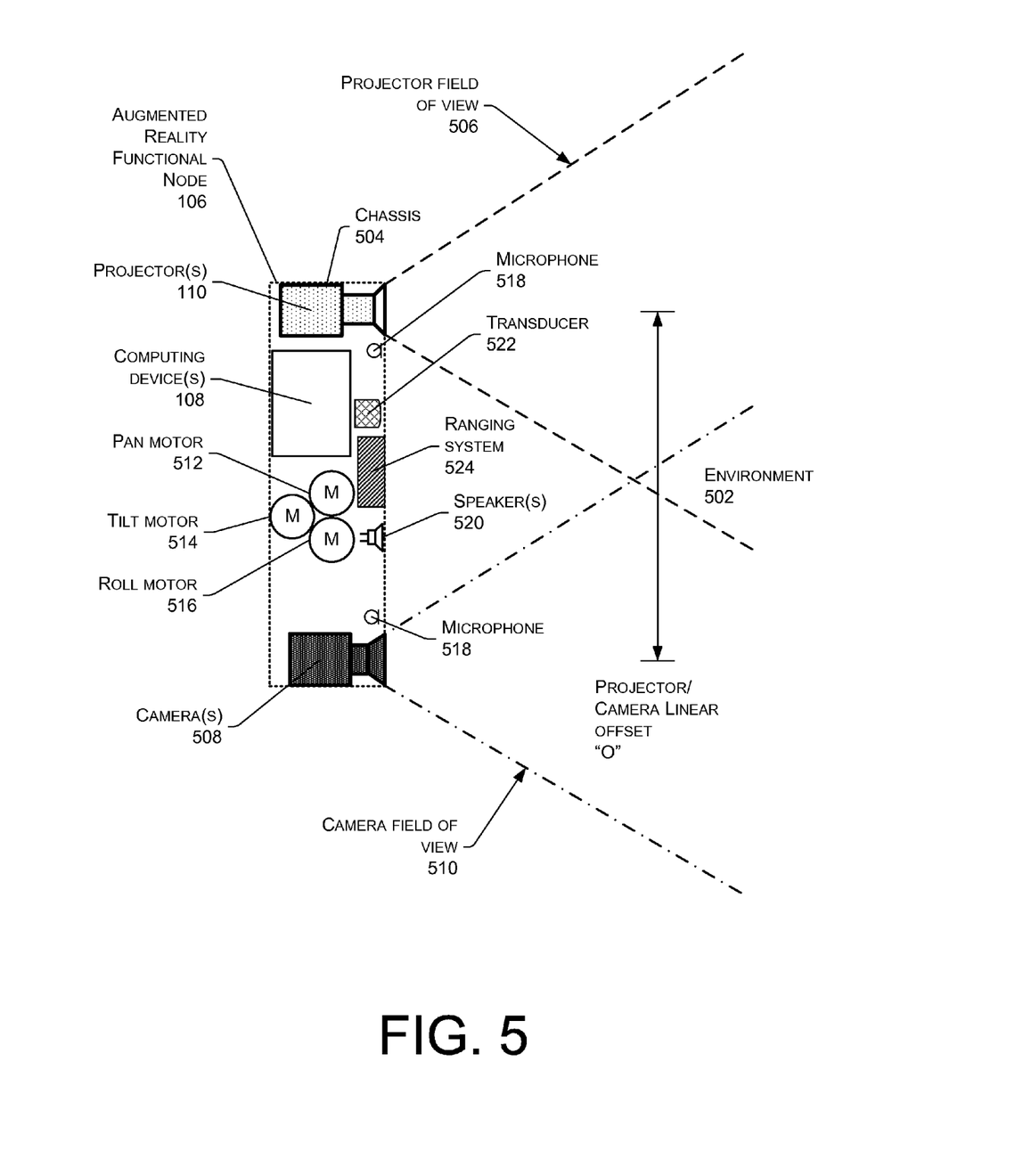
FIG. 5 shows additional details of the example ARFN of FIG. 1.

FIG. 5 shows additional details of an example ARFN that may be configured to detect a periphery of a display medium. The ARFN node 106 is configured to scan at least a portion of an environment 502 and the objects therein to detect and identify a display medium. The ARFN node 106 may also be configured to provide augmented reality output, such as images, sounds, and so forth.

A chassis 504 holds the components of the ARFN node 106. The projector(s) 110 may be disposed within the chassis 504 and may be configured to generate and project light and/or images into the environment 502. These images may be visible light images perceptible to a user, visible light images imperceptible to the user, images with non-visible light, or a combination thereof. This projector(s) 110 may be implemented with any number of technologies capable of generating an image and projecting that image onto a surface within the environment 502. Suitable technologies include a digital micromirror device (DMD), liquid crystal on silicon display (LCOS), liquid crystal display, 3LCD, and so forth. The projector(s) 110 has a projector field of view 506 which describes a particular solid angle. The projector field of view 506 may vary according to changes in the configuration of the projector(s) 110. For example, the projector field of view 506 may narrow upon application of an optical zoom to the projector(s) 110.

A camera(s) 508 may also be disposed within the chassis 504. The camera(s) 508 is configured to image the environment 502 in visible light wavelengths, non-visible light wavelengths, or both. The camera(s) 508 has a camera field of view 510 that describes a particular solid angle. The camera field of view 510 may vary according to changes in the configuration of the camera(s) 508. For example, an optical zoom of the camera(s) 510 may narrow the camera field of view 510.

In some implementations, a plurality of cameras 508 may be used. For instance, one embodiment of the ARFN node 106 may include a three-dimensional (3D), infrared (IR) camera and a red-green-blue (RGB) camera. The 3D, IR camera may be configured to capture information for detecting depths of objects within the environment 502, while the RGB camera may be configured to detect edges of objects by identifying changes in color within the environment 502. In some instances, a single camera may be configured to perform these functions.

The chassis 504 may be mounted with a fixed orientation, or may be coupled via an actuator to a fixture such that the chassis 504 may move. Actuators may include piezoelectric actuators, motors, linear actuators, and other devices configured to displace or move the chassis 504 or components therein such as the projector(s) 110 and/or the camera(s) 508. For example, in one implementation the actuator may comprise a pan motor 512, a tilt motor 514, and so forth. The pan motor 512 is configured to rotate the chassis 504 in a yawing motion. The tilt motor 514, meanwhile, is configured to change the pitch of the chassis 504. In some instances, the ARFN 106 additionally or alternatively includes a roll motor 516, which allows the chassis 504 to move in a rolling motion. By panning, tilting, and/or rolling the chassis 504, different views of the environment 502 may be acquired.

One or more microphones 518 may be disposed within the chassis 504, or elsewhere within the environment 502. The one or more microphones 518 may be used to acquire input from an entity (e.g., a user), for echolocation, location determination of a sound, or to otherwise aid in the characterization of and receipt of input from the environment 502. In some instances, a user may use voice commands to control various aspects of the ARFN node 106. A speaker(s) 520 may also be present to provide audible output, such as the output from a text-to-speech module or playback from pre-recorded audio.

A transducer 522 may be present within the ARFN node 106, or elsewhere within the environment 502, and may be configured to detect and/or generate inaudible signals, such as infrasound or ultrasound. These inaudible signals may be used to provide for signaling between accessory devices and the ARFN node 106.

The ARFN node 106 may also include a ranging system 524. The ranging system 524 is configured to provide distance information from the ARFN node 106 to a scanned entity, object (e.g., display medium), or set of objects. The ranging system 524 may comprise radar, light detection and ranging (LIDAR), ultrasonic ranging, stereoscopic ranging, and so forth. In some implementations the transducer 522, the microphones 518, the speaker(s) 520, or a combination thereof may be configured to use echolocation or echo-ranging to determine distance and spatial characteristics of an entity or object.

In this illustration, the computing device(s) 108 is shown within the chassis 504. However, in other implementations all or a portion of the computing device(s) 108 may be disposed in another location and coupled to the ARFN node 106. This coupling may occur via wire, fiber optic cable, wirelessly, or a combination thereof. Furthermore, additional resources external to the ARFN node 106 may be accessed, such as resources in another ARFN node 106 accessible via a local area network, cloud resources accessible via a wide area network connection, or a combination thereof Also shown in this illustration is a projector/camera linear offset designated "O". This is a linear distance between the projector(s) 110 and the camera(s) 508. Placement of the projector(s) 110 and the camera(s) 508 at distance "O" from one another may aid in the recovery of structured or other light data from the environment. The known projector/camera linear offset "O" may also be used to calculate distances, dimensioning, and otherwise aid in the characterization of entities or objects within the environment 502. In other implementations the relative angle and size of the projector field of view 506 and camera field of view 510 may vary. Also, the angle of the projector(s) 110 and the camera(s) 508 relative to the chassis 504 may vary.

In other implementations, the components of the ARFN node 106 may be distributed in one or more locations within the environment 100. As mentioned above, the microphones 518 and the speaker(s) 520 may be distributed throughout the environment. The projector(s) 110 and the camera(s) 508 may also be located in separate chasses 504. The ARFN node 106 may also include discrete portable signaling devices used by entities to issue command attention inputs. For example, these may be acoustic clickers (audible or ultrasonic), electronic signaling devices such as infrared emitters, radio transmitters, and so forth.

The ARFN node 106 is shown in FIG. 5 with various sensors, but other sensors may be located either within or external to the chassis 504. The sensors may include, in various embodiments, cameras (motion and/or still cameras), audio sensors such as microphones, ultrasound transducers, heat sensors, motion detectors (including infrared imaging devices), depth sensing cameras, weight sensors, touch sensors, tactile output devices, olfactory sensors, temperature sensors, humidity sensors, pressure sensors, and so forth.

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method comprising:
   determining pixels, in a portion of a depth map of an environment, that comprise edge pixels, wherein an edge pixel represents an edge of an object in the environment; and
   determining edges of an object in the environment by connecting the edge pixels;
   wherein the determining the pixels that comprise edge pixels comprises, for each pixel in the portion of the depth map:
   accessing a depth map that indicates, for each pixel of a group of pixels, a depth measurement of each respective pixel from a camera that obtained the depth map, the group of pixels comprising the pixel and pixels that are immediately adjacent to the pixel in the portion of the depth map;
   estimating a plane for the pixel based on a depth measurement of the pixel and respective depth measurements for the pixels that are immediately adjacent to the pixel in the depth map, the estimating the plane based at least in part on a total least squares algorithm or an approximation of a total least squares algorithm;
   determining inlier pixels, the inlier pixels comprising pixels of the group of pixels that belong to the plane;
   determining outlier pixels, the outlier pixels comprising pixels of the group of pixels that do not belong to the plane;
   determining a ratio of the inlier pixels to the outlier pixels;
   determining that the ratio is less than a threshold ratio; and
   determining that the pixel is an edge pixel at least partly in response to determining that the ratio is less than the threshold ratio, an edge pixel representing at least a portion of an edge of the object.

2. A method as recited in claim 1, wherein:
   the threshold ratio is a first threshold ratio;
   the determining the pixels that comprise edge pixels further comprises:
   determining that the ratio is less than a second threshold ratio, wherein the second threshold ratio is less than the first threshold ratio and is used to determine whether an edge pixel comprises a strong edge pixel or a weak edge pixel, a strong edge pixel representing an edge of the object with a higher degree of certainty than a weak edge pixel;
   and wherein determining that the pixel is an edge pixel further comprises classifying the pixel as a strong edge pixel at least partly in response to determining that the ratio is less than the second threshold ratio in addition to being less than the first threshold ratio.

3. A method as recited in claim 1, wherein:
   the threshold ratio is a first threshold ratio;
   the determining the pixels that comprise edge pixels further comprises:
   determining that the ratio is greater than or equal to a second threshold ratio, wherein the second threshold ratio is less than the first threshold ratio; and
   determining that the pixel is immediately adjacent to a second pixel associated with a second group of pixels that has a ratio of inlier pixels to outlier pixels that is less than both than the first and second threshold ratios;
   and wherein determining that the pixel is an edge pixel further comprises determining that the pixel is an edge pixel at least partly in response to determining that the pixel is immediately adjacent to the second pixel associated with the second group having the ratio of inlier pixels to outlier pixels that is less than both than the first and second threshold ratios.

4. One or more non-transitory computer-readable media storing computer-executable instructions that, when executed, cause one or more processors to perform acts comprising:

fitting a plane to a group of pixels of a depth map, each pixel of the group of pixels being associated with a depth measurement;

calculating, for each pixel of the group of pixels, a distance between the pixel and the fitted plane;

comparing, for each pixel of the group of pixels, its distance to the fitted plane to a threshold distance;

classifying pixels having a distance to the plane that is equal to or less than the threshold distance as inlier pixels and pixels having a distance to the plane that is greater than the threshold distance as outlier pixels;

determining a number of the inlier pixels;

determining a number of the outlier pixels;

calculating a ratio based at least in part on the number of the inlier pixels and the number of the outlier pixels;

comparing the ratio to a threshold ratio; and designating, based at least in part on the comparing, at least one pixel of the group of pixels as an edge pixel or a non-edge pixel based at least in part on the classifying.

5. One or more non-transitory computer-readable media as recited in claim 4, wherein the group of pixels comprises a middle pixel and immediately adjacent neighbors of the middle pixel that share edges surround the middle pixel on the depth map, each immediately adjacent pixel sharing an edge with the middle pixel, and the at least one pixel is the middle pixel.

6. One or more non-transitory computer-readable media as recited in claim 4,
wherein the designating comprises designating the at least one pixel as a non-edge pixel at least partly in response to determining that the ratio is greater than the threshold ratio and designating the at least one pixel as an edge pixel at least partly in response to determining that the ratio is less than the threshold ratio.

7. One or more non-transitory computer-readable media as recited in claim 6, wherein:
the threshold ratio comprises a first threshold ratio;
the acts further comprise comparing the ratio to a second threshold ratio, the second threshold ratio greater than the first threshold ratio; and
the designating comprises:
designating the at least one pixel as a non-edge pixel at least partly in response to determining that the ratio is greater than the first and second threshold ratios;
designating the at least one pixel as a strong edge pixel at least partly in response to determining that the ratio is less than both the first and second threshold ratios; and
designating the at least one pixel as a weak edge pixel at least partly in response to determining that the ratio is less than the second threshold ratio but greater than the first threshold ratio.

8. One or more non-transitory computer-readable media as recited in claim 7, the acts further comprising determining, for a weak edge pixel, whether the weak edge pixel is within a threshold distance from a strong edge pixel in the depth map.

9. One or more non-transitory computer-readable media as recited in claim 8, the acts further comprising:
determining edges of an object in an environment based on (1) strong edge pixels, and (2) weak edge pixels that are within the threshold distance from a strong edge pixel.

10. One or more non-transitory computer-readable media as recited in claim 7, the acts further comprising determining, for a weak edge pixel, whether the weak edge pixel is immediately adjacent to a strong edge pixel in the depth map;
and the acts further comprising determining edges of an object from (1) strong edge pixels, and (2) weak edge pixels that are immediately adjacent to a strong edge pixel.

11. One or more non-transitory computer-readable media as recited in claim 4, wherein the group of pixels comprises a first group of pixels, and the acts further comprising:
fitting a second plane to a second group of pixels of the depth map, each pixel of the second group of pixels being associated with a depth measurement;
calculating, for each pixel of the second group of pixels, a distance between the pixel and the second plane;
comparing, for each pixel of the second group of pixels, its distance to the second fitted plane to the threshold distance;
classifying pixels having a distance to the second plane that is equal to or less than the threshold distance as second inlier pixels and pixels having a distance to the plane that is greater than threshold distance as second outlier pixels; and
designating at least one pixel of the second group of pixels as an edge pixel or a non-edge pixel based at least in part on the classifying pixels of the second group of pixels.

12. One or more non-transitory computer-readable media as recited in claim 11, the acts further comprising:
determining pixels of the first and second groups that comprise edge pixels; and
determining edges of an object from edge pixels of the first and second groups.

13. One or more non-transitory computer-readable media as recited in claim 4, wherein the fitting comprises fitting the plane using a total least squares regression algorithm or an approximation of a total least squares regression algorithm.

14. A system comprising:
one or more processors; and
one or more non-transitory computer-readable media storing computer-executable instructions that, when executed, cause the one or more processors to perform acts comprising:
fitting a plane to a group of pixels of a depth map, each pixel of the group of pixels being associated with a depth measurement, the group of pixels comprising a middle pixel and immediately adjacent neighbors of the middle pixel that share respective edges with the middle pixel on the depth map;
calculating, for each pixel of the group of pixels, a distance between the pixel and the fitted plane;
comparing, for each pixel of the group of pixels, its distance to the fitted plane to a threshold distance;
classifying pixels having a distance to the plane that is equal to or less than the threshold distance as inlier pixels and pixels having a distance to the plane that is greater than the threshold distance as outlier pixels; and
designating at least one pixel of the group of pixels as an edge pixel or a non-edge pixel based at least in part on the classifying, the at least one pixel comprising the middle pixel of the group of pixels.

15. A system as recited in claim 14, the acts further comprising:
determining a number of the inlier pixels;
determining a number of the outlier pixels;

calculating a ratio of the number of the inlier pixels to the number of the outlier pixels; and comparing the ratio to a threshold ratio;

and wherein the designating comprises designating the at least one pixel as a non-edge pixel at least partly in response to determining that the ratio is greater than the threshold ratio and designating the at least one pixel as an edge pixel at least partly in response to determining that the ratio is less than the threshold ratio.

16. A system as recited in claim 15, wherein:

the threshold ratio comprises a first threshold ratio;

the acts further comprise comparing the ratio to a second threshold ratio, the second threshold ratio greater than the first threshold ratio; and the designating comprises:

designating the at least one pixel as a non-edge pixel at least partly in response to determining that the ratio is greater than the first and second threshold ratios;

designating the at least one pixel as a strong edge pixel at least partly in response to determining that the ratio is less than both the first and second threshold ratios; and designating the at least one pixel as a weak edge pixel at least partly in response to determining that the ratio is less than the second threshold ratio but greater than the first threshold ratio.

17. A system as recited in claim 14, the acts further comprising:

determining a number of the inlier pixels;

determining a number of the outlier pixels;

calculating a ratio based at least in part on the number of the inlier pixels and the number of the outlier pixels; and comparing the ratio to a threshold ratio;

and wherein the designating is based at least in part on the comparing.

\* \* \* \* \*